United States Patent
Jung

(10) Patent No.: US 9,118,191 B2
(45) Date of Patent: Aug. 25, 2015

(54) CELL BALANCING METHOD, CELL BALANCING DEVICE, AND ENERGY STORAGE SYSTEM INCLUDING THE CELL BALANCING DEVICE

(75) Inventor: Seok-Min Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 537 days.

(21) Appl. No.: 13/534,859

(22) Filed: Jun. 27, 2012

(65) Prior Publication Data

US 2013/0049698 A1    Feb. 28, 2013

Related U.S. Application Data

(60) Provisional application No. 61/528,608, filed on Aug. 29, 2011.

(51) Int. Cl.
    *H02J 7/00*      (2006.01)

(52) U.S. Cl.
    CPC ............. *H02J 7/0016* (2013.01); *H02J 7/0086* (2013.01)

(58) Field of Classification Search
    CPC .............................. H02J 7/0086; B60L 3/0046
    USPC .......................................................... 320/134
    See application file for complete search history.

(56) References Cited

U.S. PATENT DOCUMENTS

| | | | |
|---|---|---|---|
| 8,159,184 B2 * | 4/2012 | Emori et al. ............... | 320/116 |
| 2003/0112011 A1 | 6/2003 | Guiheen et al. | |
| 2009/0167248 A1 | 7/2009 | Murao et al. | |
| 2010/0085009 A1 | 4/2010 | Kang et al. | |
| 2010/0194339 A1 | 8/2010 | Yang et al. | |
| 2011/0127962 A1 | 6/2011 | Murao et al. | |
| 2011/0127963 A1 | 6/2011 | Murao et al. | |

FOREIGN PATENT DOCUMENTS

| | | |
|---|---|---|
| JP | 2000-134805 | 5/2000 |
| JP | 2007-244142 | 9/2007 |
| JP | 2011-115016 | 6/2011 |

OTHER PUBLICATIONS

EPO Search Report dated Jul. 1, 2014, for corresponding European Patent application 12179833.4, (6 pages).
Patent Abstracts of Japan, and English machine translation for Japanese Publication 2000-134805 dated May 12, 2000, listed above, (36 pages).
English Machine Translation of Jp 2007-244142, 41 pages.
Kyungwon Seo et al., Effect of Cell Balancing Range on Lithium Ion Battery Pack Capacity, Samsung Best Paper Award 2011, 7 pages.
EPO Office action dated Feb. 12, 2015, for corresponding European Patent application 12179833.4, (4 pages).
SIPO Office action dated May 5, 2015, for corresponding Chinese Patent application 201210310426.8, (10 pages).

* cited by examiner

*Primary Examiner* — Thuan Do
(74) *Attorney, Agent, or Firm* — Christie, Parker & Hale, LLP

(57) ABSTRACT

A method of balancing a plurality of battery cells includes acquiring an open circuit voltage (OCV) of a battery cell of the plurality of battery cells connected in series; determining a state of charge (SOC) of the battery cell based on the OCV of the battery cell; determining a differential value in the OCV of the battery cell per a change of the SOC of the battery cell, in accordance with the SOC of the battery cell; and activating cell balancing of the plurality of battery cells when the differential value is greater than a reference value.

11 Claims, 12 Drawing Sheets

|  | LOW VOLTAGE AREA | | HIGH VOLTAGE AREA | |
|---|---|---|---|---|
|  | BEFORE BALANCING | AFTER BALANCING | BEFORE BALANCING | AFTER BALANCING |
| Lithium iron phosphate | 45.44 Ah | 46.92 Ah | 45.44 Ah | 45.66 Ah |
| Lithium manganese oxide | 54.13 Ah | 57.64 Ah | 54.13 Ah | 57.66 Ah |

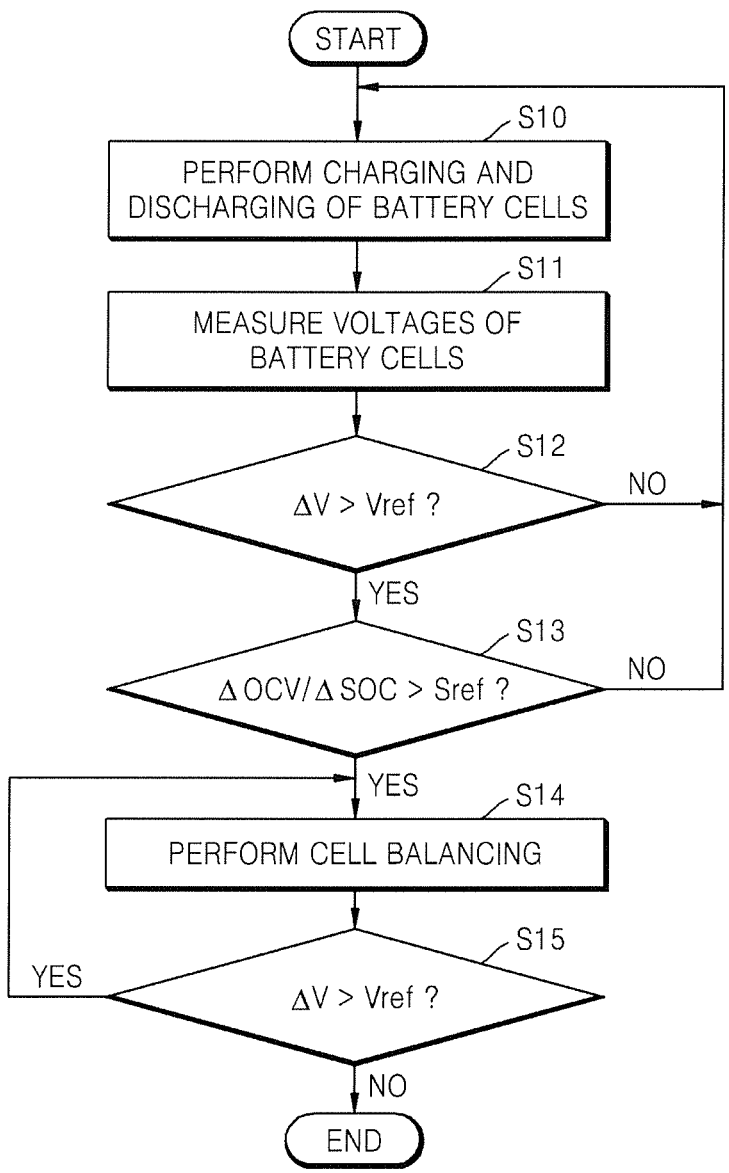

CELL BALANCING METHOD, CELL BALANCING DEVICE, AND ENERGY STORAGE SYSTEM INCLUDING THE CELL BALANCING DEVICE

CROSS-REFERENCE TO RELATED APPLICATION

This application claims the benefit of and priority to U.S. Provisional Application No. 61/528,608, filed on Aug. 29, 2011, in the United States Patent and Trademark Office, the disclosure of which is incorporated herein in its entirety by reference.

BACKGROUND

1. Field

One or more embodiments of the present invention relate to cell balancing methods, cell balancing devices, and energy storage systems including the cell balancing devices.

2. Description of Related Art

As environmental destruction and exhaustion of resources are being noticed as serious problems, a system for storing energy and using the energy efficiently has been increasingly gaining interest. In addition, novel renewable energy, which does not cause pollution or causes little pollution during a generation process, is gaining interest. An energy storage system may be a system that interconnects renewable energy, a battery system for storing power, and an existing grid, and research is vigorously conducted into the same in accordance with changes in the environment.

Such an energy storage system may include a large number of battery cells, and it is important to monitor states of the battery cells, for example, voltage, temperature, or current thereof, and to efficiently manage the battery cells based on a monitoring result.

SUMMARY

According to an embodiment of the present invention, a method of balancing a plurality of battery cells is provided. The method includes acquiring an open circuit voltage (OCV) of a battery cell of the plurality of battery cells connected in series; determining a state of charge (SOC) of the battery cell based on the OCV of the battery cell; determining a differential value in the OCV of the battery cell per a change of the SOC of the battery cell, in accordance with the SOC of the battery cell; and activating cell balancing of the plurality of battery cells when the differential value is greater than a reference value.

The method may further include determining a voltage difference between a maximum voltage and a minimum voltage among the open circuit voltages (OCVs) of the battery cells, and activating cell balancing of the plurality of battery cells when the voltage difference is greater than a reference voltage.

The method may further include monitoring the voltage difference and inactivating the cell balancing of the battery cells when the voltage difference is less than or equal to the reference voltage.

According to an embodiment, activating cell balancing of the plurality of battery cells may include performing selectively charging or discharging the battery cell.

According to another embodiment of the present invention, a cell balancing device includes a battery management unit electrically connected with a plurality of battery cells. The battery management unit is configured to acquire an open circuit voltage (OCV) of a battery cell of the plurality of battery cells; determine a state of charge (SOC) of the battery cell based on the OCV of the battery cell; determine a differential value in the OCV of the battery cell per a change of the SOC of the battery cell, in accordance with the SOC of the battery cell; and activate cell balancing of the plurality of battery cells when the differential value is greater than a reference value.

The battery management unit may be further configured to determine a voltage difference between a maximum voltage and a minimum voltage among the open circuit voltages (OCVs) of the battery cells, and activate cell balancing of the plurality of battery cells when the voltage difference is greater than a reference voltage.

The battery management unit may be further configured to monitor the voltage difference and to inactivate the cell balancing of the battery cells when the voltage difference is less than the reference voltage.

The battery management unit may include a controller; and a cell balancing unit electrically connected to the battery cells and operatively connected to the controller, wherein the cell balancing unit is configured to selectively discharge the battery cell in accordance with control signals from the controller.

According to another embodiment of the present invention, an energy storage system includes a battery system for storing energy from an energy generation system or a power grid; and a power conversion system for controlling power conversion among the battery system, the energy generation system, and the power grid. The battery system includes a plurality of serially connected battery cells; and a battery management unit electrically connected with the battery cells. The battery management unit is configured to acquire an open circuit voltage (OCV) of a battery cell of the plurality of battery cells; determine a state of charge (SOC) of the battery cell based on the OCV of the battery cell; determine a differential value in the OCV of the battery cell per a change of the SOC of the battery cell, in accordance with the SOC of the battery cell; and activate cell balancing of the plurality of battery cells when the differential value is greater than a reference value.

According to another embodiment of the present invention, a method of balancing a plurality of battery cells is provided. The method includes acquiring open circuit voltages of a plurality of battery cells connected in series; calculating a difference between a minimum open circuit voltage and a maximum open circuit voltage selected from the plurality of the battery cells; and activating cell balancing of the plurality of battery cells when the difference is greater than a reference value.

BRIEF DESCRIPTION OF THE DRAWINGS

FIG. 17 is a flowchart illustrating a cell balancing method according to an embodiment of the present invention.

DETAILED DESCRIPTION

Figure 1:
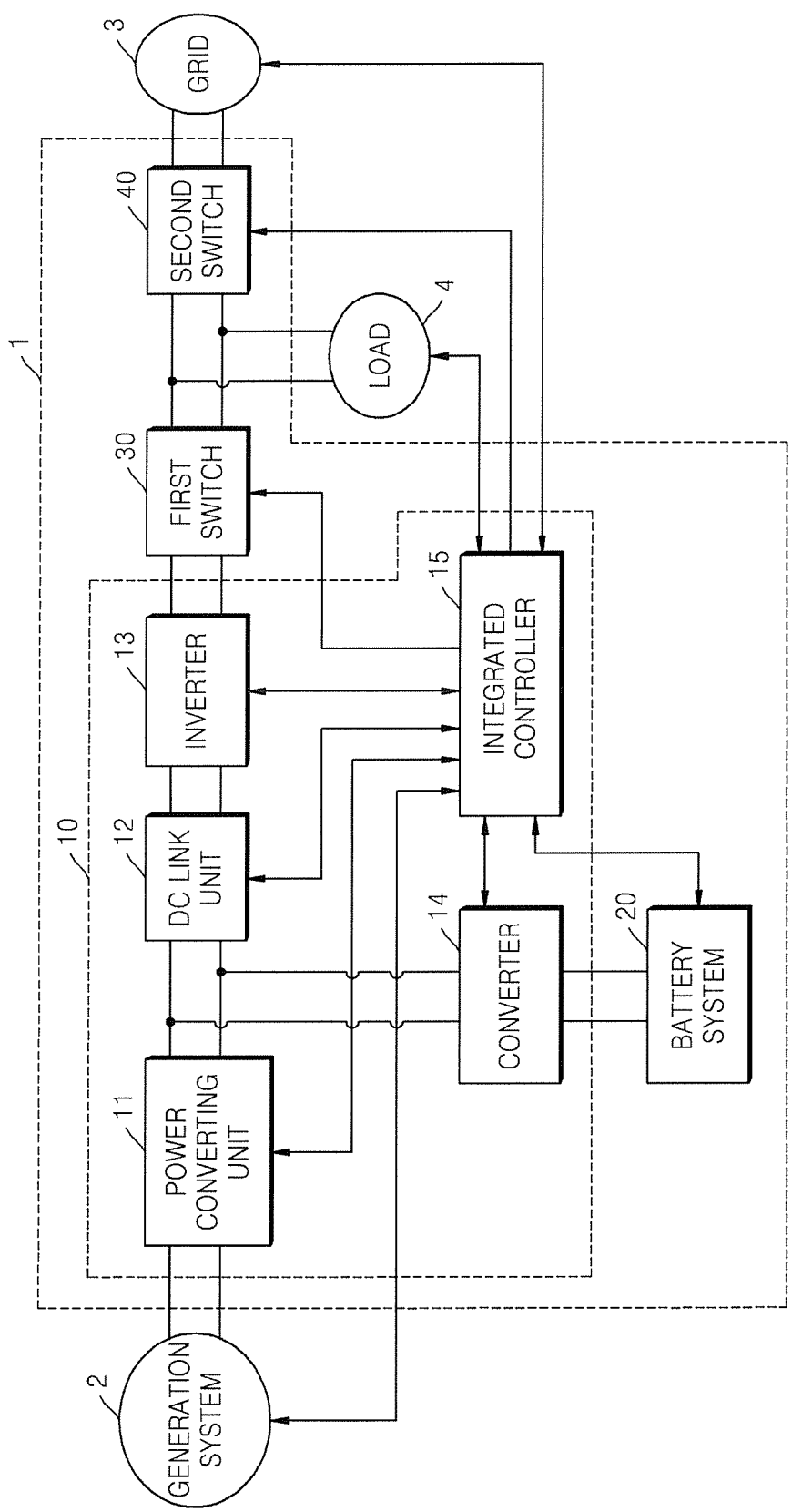
FIG. 1 is a block diagram illustrating an energy storage system according to an embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art may be omitted when it is deemed that they may unnecessarily obscure the essence of the invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

One or more embodiments of the present invention include cell balancing methods, cell balancing devices, and energy storage systems including the cell balancing devices that are capable of performing cell balancing efficiently.

According to embodiments of the present invention, cell balancing may be performed efficiently by cell balancing devices and energy storage system including the cell balancing devices.

The embodiments of the present invention will be described below in more detail with reference to the accompanying drawings. Those components that are the same or are in correspondence are denoted by the same reference numeral regardless of the figure number, and redundant explanations are omitted.

FIG. 1 is a block diagram illustrating an energy storage system 1 according to an embodiment of the present invention.

Referring to FIG. 1, the energy storage system 1 supplies power to a load 4 in connection with a generation system 2 and a grid 3.

The generation system 2 produces power using an energy source. The generation system 2 supplies the produced power to the energy storage system 1. The generation system 2 may be, for example, a solar energy generation system, a wind power generation system, or a tidal power generation system. However, the generation system 2 is not limited thereto. Any electricity generation system that produces electricity using new or recycled energy, such as solar heat and geothermal heat, may be used as the generation system 2. In particular, solar cells, which produce electric energy using solar light, are easy to install in homes or factories, and thus may be appropriately used as the generation system 2 when distributed in home or factories. The generation system 2 may include a plurality of generation modules arranged in parallel and produce power from the modules, thereby constituting a large capacity energy system.

The grid 3 may include a power plant, a transformer substation, power lines, etc. In a normal state, the grid 3 supplies power to the energy storage system 1 so as to supply power to the load 4 and/or a battery system 20, and receives power from the energy storage system 1. In an abnormal state, the grid 3 stops supplying power to the energy storage system 1, and the energy storage system 1 stops supplying power to the grid 3.

The load 4 consumes power produced by the generation system 2, power stored in the battery system 20, and/or power supplied from the grid 3. The load 4 may be, for example, a home or a factory.

The energy storage system 1 may store power produced by the generation system 2 in the battery system 20 and supply the produced power to the grid 3. Also, the energy storage system 1 may supply power stored in the battery system 20 to the grid 3 or store power supplied from the grid 3 at the battery system 20. Also, if the grid 3 is in an abnormal state, for example, in cases of blackout, the energy storage system 1 performs an uninterruptible power supply (UPS) operation to supply power to the load 4. Also, the energy storage system 1 may supply the power produced by the generation system 2 or the power stored in the battery system 20 to the load 4 when the grid 3 is in a normal state.

The energy storage system 1 includes a power conversion system (PCS) 10 for controlling power conversion, the battery system 20, a first switch 30, and a second switch 40.

The PCS 10 converts power of the generation system 2, the grid 3, or the battery system 20 into a proper or usable form of power to be supplied to wherever the power is needed. The PCS 10 includes a power converting unit 11, a DC link unit 12, an inverter 13, a converter 14, and an integrated controller 15.

The power converting unit 11 is connected between the generation system 2 and the DC link unit 12. The power converting unit 11 transfers power produced by the generation system 2 to the DC link unit 12; here, the power converting unit 11 converts an output voltage into a direct current link voltage.

The power converting unit 11 may include a power converting circuit such as a converter or a rectifying circuit according to the type of the generation system 2. If the generation system 2 produces direct current power, the power converting unit 11 may include a converter for converting a direct current into another direct current. If the generation system 2 produces an alternating current power, the power converting unit 11 may include a rectifying circuit for converting an alternating current into a direct current. In one embodiment, when the generation system 2 produces power from solar light, the power converting unit 11 may include a maximum power point tracking (MPPT) converter that conducts MPPT control in order to maximize power produced by the generation system 2 according to variations in solar irradiance, temperature, or the like. If no power is produced by the generation system 2, the power converting unit 11 may stop operating to minimize or reduce power consumption by a converter or the like.

The direct current link voltage may be unstable in magnitude or amplitude due to a transient voltage drop in the generation system 2 or the grid 3, or a peak load generated in the load 4. However, the direct current link voltage has to be stabilized so as to allow normal operations of the converter 14 and the inverter 13. The DC link unit 12 is connected between the power converting unit 11 and the inverter 13 to uniformly or substantially maintain the direct current link voltage. For example, a large capacity capacitor may be used as the DC link unit 12.

The inverter 13 is a power converter connected between the DC link unit 12 and the first switch 30. The inverter 13 may include an inverter that converts the direct current link voltage output from the generation system 2 and/or the battery system 20 in a discharge mode into an alternating current voltage and outputs the same. Also, in order to store power of the grid 3 in the battery system 20 during a charging mode, the inverter 13 may include a rectifying circuit that rectifies an alternating current voltage of the grid 3 and converts the same into the direct current link voltage. The inverter 13 may include a bi-directional inverter that is capable of changing (e.g., reversing) input and output directions.

The inverter 13 may include a filter to remove harmonic waves from an alternating current voltage output therefrom. Also, the inverter 13 may include a phase locked loop (PLL) circuit to synchronize a phase of the alternating current voltage output from the inverter 13 with a phase of an alternating current voltage of the grid 3 in order to prevent reactive power from generating. In addition, the inverter 13 may restrict or limit a voltage fluctuation range, improve a power factor, remove direct current components, prevent or reduce transient phenomena, or the like. When not in use, the inverter 13 may stop operating in order to minimize or reduce power consumption.

The converter 14 is a power converter connected between the DC link unit 12 and the battery system 20. The converter 14 includes a converter that performs DC-DC conversion, and more specifically, a converter that converts power stored in the battery system 20 in a discharging mode to a voltage level desired or usable by the inverter 13, that is, to the direct current link voltage, and outputs the same. Also, the converter 14 includes a converter that performs DC-DC conversion. That is, the converter converts a voltage of power output from the power converting unit 11 or power output from the inverter 13 to a voltage level desired by the battery system 20, e.g., a charging voltage. Alternatively, the converter 14 may be a bi-directional converter capable of changing input and output directions. When charging or discharging of the battery system 20 is not performed, the converter 14 may stop operating to minimize or reduce power consumption.

The integrated controller 15 monitors states of the generation system 2, the grid 3, the battery system 20, and the load 4, and controls the power converting unit 11, the inverter 13, the converter 14, the first switch 30, and the second switch 40 according to monitoring results and algorithms that are set in advance. The integrated controller 15 may monitor whether or not a blackout is generated in the grid 3, whether or not power is produced by the generation system 2, an amount of power produced by the generation system 2 when power is generated by the generation system 2, a state of charge of the battery system 20, an amount of power consumption of the load 4, time, or the like. In addition, if power to be supplied to the load 4 is not sufficient, for example, in cases when a blackout is generated in the grid 3, the integrated controller 15 may determine priorities of power-using appliances included in the load 4, and may control the load 4 to supply power to a power-using appliance having the highest priority.

The first switch 30 and the second switch 40 are serially connected between the inverter 13 and the grid 3, and are turned on/off according to control by the integrated controller 15 to control a current flow between the generation system 2 and the grid 3. The first switch 30 and the second switch 40 may be turned on/off according to states of the generation system 2, the grid 3, and the battery system 20.

In more detail, when supplying power of the generation system 2 and/or the battery system 20 to the load 4 or when supplying power of the grid 3 to the battery system 20, the first switch 30 is turned on. When supplying power of the generation system 2 and/or the battery system 20 to the grid 3 or when supplying power of the grid 3 to the load 4 and/or the battery system 20, the second switch 40 is turned on.

On the other hand, if a blackout occurs in the grid 3, the second switch 40 is turned off, and the first switch 30 is turned on. That is, power is supplied from the generation system 2 and/or the battery system 20 to the load 4, and at the same time, power supplied to the load 4 is prevented from flowing to the grid 3. Accordingly, the energy storage system 1 is operated as a stand alone system, thereby preventing accidents such as electric shock of workers working on power lines of the grid 3 due to power transmitted from the energy storage system 1.

Switching devices such as relays capable of enduring or handling a large current may be used as the first switch 30 and the second switch 40.

The battery system 20 receives power produced by the generation system 2 and/or power of the grid 3 and stores the same, and supplies the stored power to the load 4 and/or the grid 3. The battery system 20 may include a unit for storing power and a unit for controlling and protecting the unit for storing power. Hereinafter, the battery system 20 will be described in more detail with reference to FIG. 2.

Figure 2:
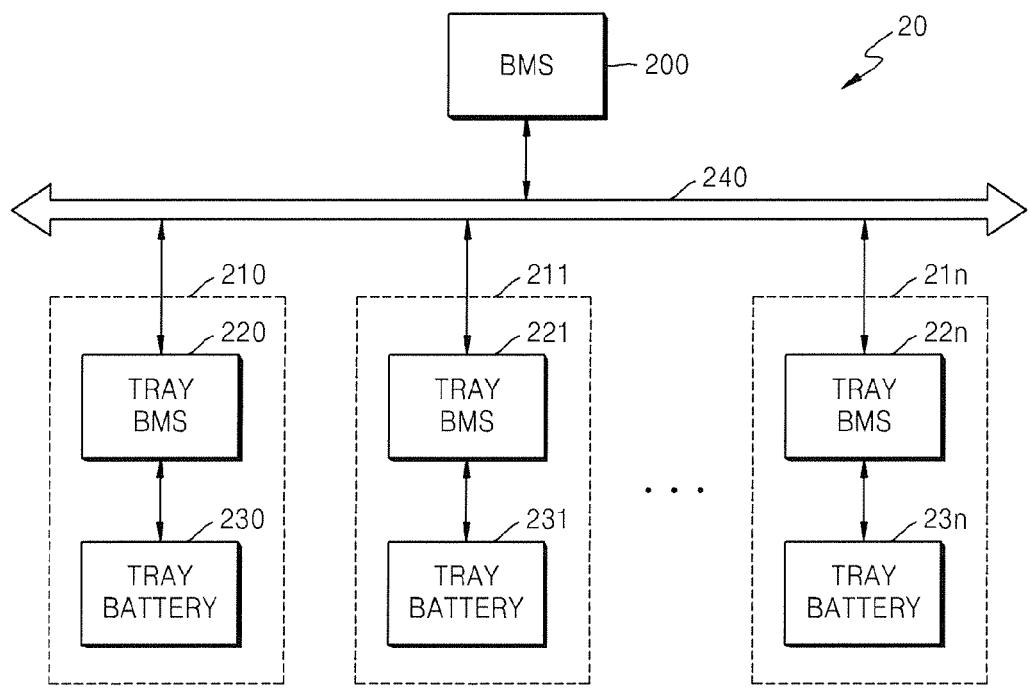
FIG. 2 is a block diagram illustrating a battery system according to an embodiment of the present invention.

FIG. 2 is a block diagram illustrating the battery system 20 according to an embodiment of the present invention.

Referring to FIG. 2, the battery system 20 may include a battery management system (BMS) 200, a plurality of trays 210, 211-21n, and a bus line 240.

The BMS 200 controls the overall operation of the battery system 20. The BMS 200 receives from tray BMSs 220, 221-22n data that are obtained by measuring voltages and temperatures of battery cells included in tray batteries 230, 231-23n.

The BMS 200 collects the received data and analyzes the same, and transmits an analysis result to the integrated controller 15. Alternatively, the BMS 200 may immediately transmit the received data to the integrated controller 15.

The BMS 200 transmits a command for controlling the tray BMSs 220, 221-22n according to a command from the integrated controller 15 or an analysis result of the received data, to corresponding trays BMS 220, 221-22n. Also, the BMS 200 may instruct the tray BMSs 220, 221-22n to transmit results of measured states of the tray batteries 230, 231-23n to the BMS 200.

The plurality of trays 210, 211-21n are subordinate units of the battery system 20, each including one of the tray BMSs 220, 221-22n and one of the tray batteries 230, 231-23n. That is, the BMS 200 and the plurality of trays 210, 211-21n may correspond to or operate in a master-slave configuration or a superordinate-subordinate configuration.

The tray BMSs 220, 221-22n measure states of the tray batteries 230, 231-23n, for example, voltages and temperatures, and control the battery cells included in the tray batteries 230, 231-23n so that the battery cells perform cell balancing according to measurement results. Also, the tray BMSs 220, 221-22n may transmit the measurement results to the BMS 200 via the bus line 240, and receive a command from the BMS 200 via the bus line 240 to perform a set or predetermined operation.

The tray batteries 230, 231-23n may store external power, for example, power supplied from the grid 3 or the generation system 2, and may supply the stored power to the load 4. The tray batteries 230, 231-23n may each include battery cells as subordinate components. The number of battery cells may be determined according to a required output voltage. Various rechargeable secondary batteries may be used as the battery cells. For example, examples of secondary batteries that may be used as the battery cells include nickel-cadmium batteries, lead storage batteries, nickel metal hydride batteries (NiMH), lithium ion batteries, and lithium polymer batteries.

The bus line 240 is used as a path through which data or commands are transmitted between the BMS 200 and the tray BMSs 220, 221-22n. As a communication protocol between the BMS 200 and the tray BMSs 220, 221-22n, a controller area network (CAN) communication protocol may be used. However, the communication protocol is not limited thereto, and any suitable communication protocol in which data or commands are transmitted via a bus line may be applied.

In addition, while communication is performed via the bus line 240 according to the current embodiment of the present invention, the embodiment of the present invention is not limited thereto. For example, the tray BMSs 220, 221-22n may be connected serially to transmit data or commands to adjacent tray BMSs, and a particular BMS may be configured to communicate with the BMS 200.

Here, although the battery system 20 is shown to include one BMS 200 and the plurality of trays 210, 211-21n controlled using the BMS 200 with reference to FIG. 2, the embodiment of the present invention is not limited thereto. For example, if a large amount of power is required, a plurality of the battery systems 20 may be included, and a system BMS for controlling all the battery systems 20 may be included.

Hereinafter, the tray 210 will be described in more detail.

Figure 3:
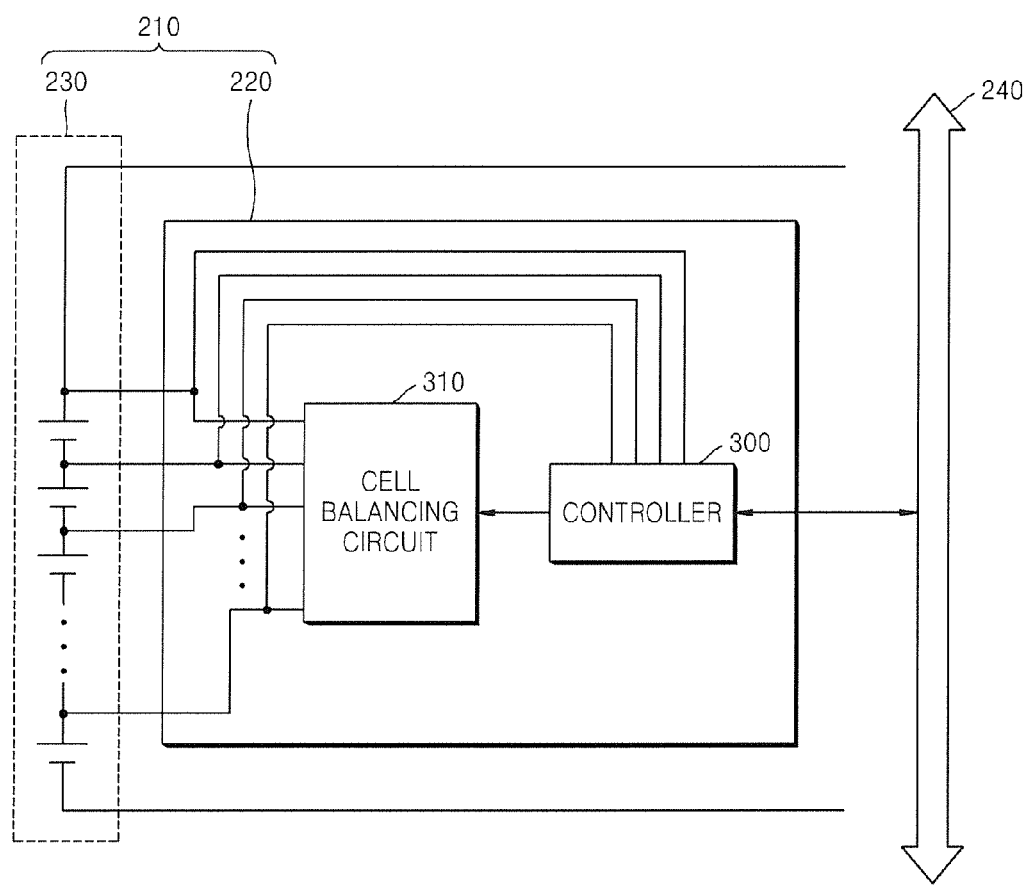
FIG. 3 illustrates a tray battery and a tray battery management system (BMS) according to an embodiment of the present invention.

FIG. 3 illustrates the tray battery 230 and the tray BMS 220 according to an embodiment of the present invention. Referring to FIG. 3, the tray 210 includes the tray BMS 220 and the tray battery 230.

The tray battery 230 includes a plurality of battery cells.

The tray BMS 220 measures voltages, temperatures, or the like of the battery cells included in the tray battery 230, and transmits results of measurement to the BMS 200 via the bus line 240. Alternatively, the tray BMS 220 may analyze the results of measurement and transmit the results to the BMS 200. The tray BMS 220 includes a controller 300 and a cell balancing circuit 310.

The controller 300 measures a total voltage or an intermediate voltage (e.g., a total voltage of whole battery cells or a voltage of each battery cell) of the tray battery 230. A voltage value measured using the controller 300 may be any of an open circuit voltage of the battery cells and an actually measured voltage of the battery cells measured during charging or discharging. The controller 300 may be electrically connected to nodes between the battery cells in order to measure a total voltage or an intermediate voltage of the tray battery 230. That is, one or more wirings may be formed between the controller 300 and the battery cells to measure an intermediate voltage of the tray battery 230.

The controller 300 calculates states of charge of the battery cells based on the measurement results. The controller 300 may detect an open circuit voltage of the battery cells, and may calculate states of charge of each of the battery cells based on data that shows a relationship between the open circuit voltage and the states of charge. Accordingly, the controller 300 may include a data table showing the relationship between the open circuit voltage and the states of charge. However, the method of calculating the states of charge of the battery cells is not limited to the above method of measuring from an open circuit voltage. Various suitable methods of calculating a state of charge, such as a current integration method, may be used.

The controller 300 determines whether or not the battery cells are to perform cell balancing based on the detected voltage or the calculated states of charge. The controller 300 sets a condition for performing cell balancing in advance, and determines whether the detected open circuit voltage, an actually measured voltage, and the calculated states of charge satisfy the set condition. The condition set by the controller 300 for cell balancing will be described in more detail later with reference to FIGS. 16 and 17.

The cell balancing circuit 310 performs cell balancing of the battery cells according to control by the controller 300. The cell balancing circuit 310 may perform cell balancing using a passive cell balancing method in which power of a battery cell having a relatively high state of charge is discharged via balancing resistance (e.g., a resistor). Alternatively, the cell balancing circuit 310 may perform cell balancing using an active cell balancing method in which power of a battery cell having a relatively high state of charge is supplied to a battery cell having a relatively low state of charge.

The cell balancing circuit 310 may perform cell balancing for each of the battery cells, or in groups of a plurality of battery cells.

While only one line through which a command is transmitted from the controller 300 to the cell balancing circuit 310 is illustrated in FIG. 3 for convenience of description, any suitable number of lines needed to control the cell balancing circuit 310 may also be utilized.

Above, the controller 300 and the cell balancing circuit 310 are described as a cell balancing apparatus according to embodiments of the present invention. Hereinafter, a desired or designed condition for performing cell balancing using the cell balancing apparatus will be described in more detail.

Figure 4:
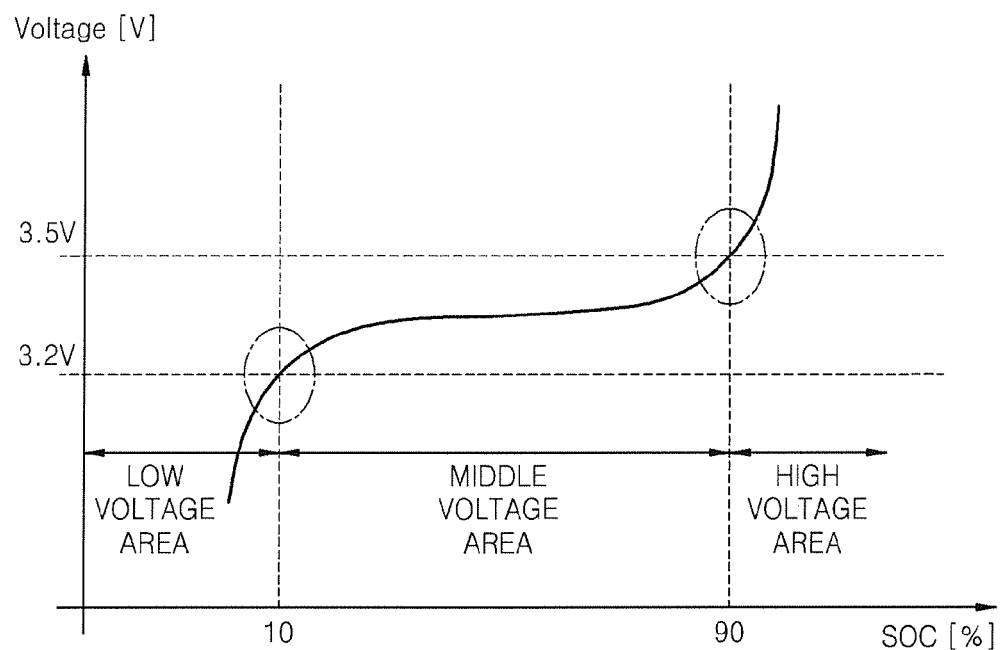
FIG. 4 is a graph showing charging characteristics of battery cell according to an embodiment of the present invention.

FIG. 4 is a graph showing charging characteristics of a battery cell according to an embodiment of the present invention. In FIG. 4, a horizontal axis indicates a state of charge (SOC), and a vertical axis indicates a voltage of the battery cell.

Referring to FIG. 4, a lithium iron phosphate (LiFePO$_4$) battery is used as the battery cell. A charging curve includes a low voltage area where a voltage increases abruptly according to a state of charge, a middle voltage area where a voltage increases gradually, and a high voltage area where a voltage increases abruptly again. Voltages illustrated in FIG. 4 denote actually measured voltages when charging. In FIG. 4, an area where a voltage is less than about 3.2 V (a state of charge of 10%) is set as a low voltage area. An area where a voltage exceeds about 3.5 V (a state of charge of 90%) is set as a high voltage area, and the remaining area where a voltage is 3.2 V to 3.5 V (a state of charge of 10-90%) is set as a middle voltage area.

Figure 5:
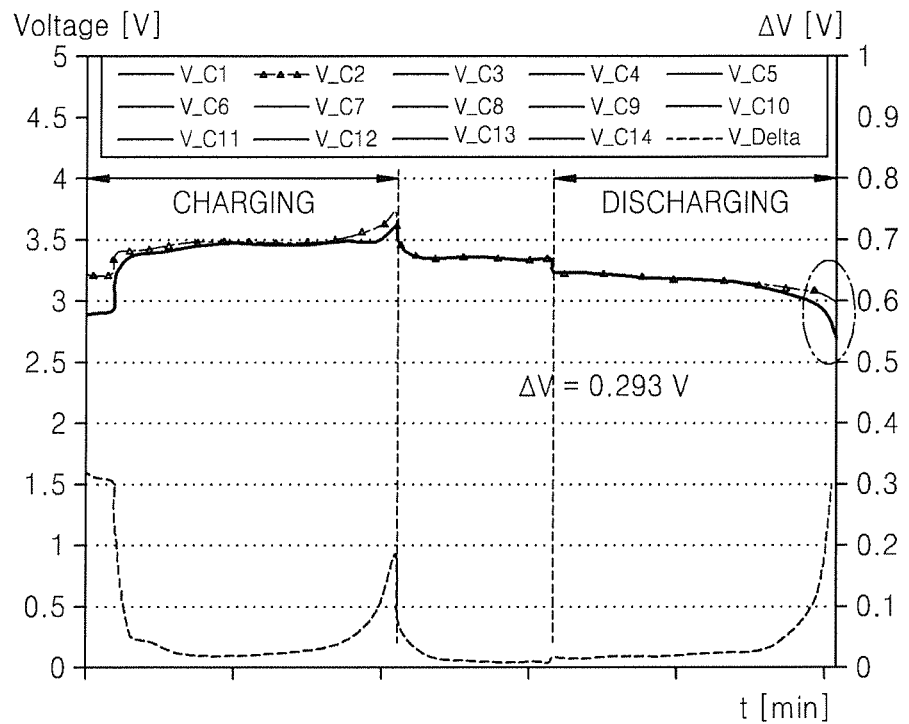
FIG. 5 is a graph illustrating charging/discharging characteristics before conducting cell balancing on the battery cells of FIG. 4 according to an embodiment of the present invention.

FIG. 5 is a graph illustrating charging/discharging characteristics before conducting cell balancing using battery cells each having the characteristics of the battery of FIG. 4 according to an embodiment of the present invention. In FIG. 5, a horizontal axis denotes time, and a vertical axis denotes a voltage. Time for charging and discharging is not relevant to the gist of the embodiments of the present invention, and thus is not illustrated. Also, specific values of the time axis will be omitted not only in FIG. 5 but also in other drawings.

According to an embodiment of the present invention, a total of 14 battery cells are connected serially. Plots illustrated in an upper portion of the graph of FIG. 5 denote voltages of the battery cells. Plots illustrated in a lower portion of the graph of FIG. 5 denote a voltage difference ΔV between a highest voltage Vmax and a lowest voltage Vmin among the voltage values of the battery cells.

Before conducting experiments of cell balancing of the battery cells, following operations were performed to provide a condition for cell balancing.

First, after completely discharging a plurality of battery cells, charging and discharging were performed once. Then an initial capacity of the battery cells was measured, and a state of charge of the battery cells was adjusted to be 10% via discharging. Then, a set or predetermined battery cell or second battery cell (e.g., V-C2) was separately charged to increase its voltage by about 0.1 V and then combined with the rest of the battery cells. Accordingly, the capacity of the battery cells was increased by about 4 Ah. After combining, the battery cells were completely discharged. The operations so far represent an initial state of the graph of FIG. 5.

As illustrated in FIG. 5, a plot denoted by a line including triangles denotes a voltage of the second battery cell (V_C2) that was separately charged. Voltages of the rest of the battery cells appear similar, and thus plots of the battery cells appear to be overlapped. Since distinguishing the voltage values of the battery cells other than the second battery cell (V_C2) is irrelevant to the gist of the present invention, they are denoted by a single line in FIG. 5. In addition, the plots of the battery cells other than the second battery cell will be illustrated by a single solid line not only in FIG. 5 but also in other drawings.

After preparation for cell balancing was completed, charging and discharging were performed once as illustrated in FIG. 5. Here, discharging was performed until a state of charge of all the battery cells was adjusted to be 10%. The state of charge was set as 10% in order to perform cell balancing in a low voltage section.

The voltage difference ΔV of FIG. 5 after finishing charging was about 0.186 V, and the voltage difference ΔV after finishing discharging was about 0.293 V. The total capacity of the battery cells measured was about 45.44 Ah.

Figure 6:
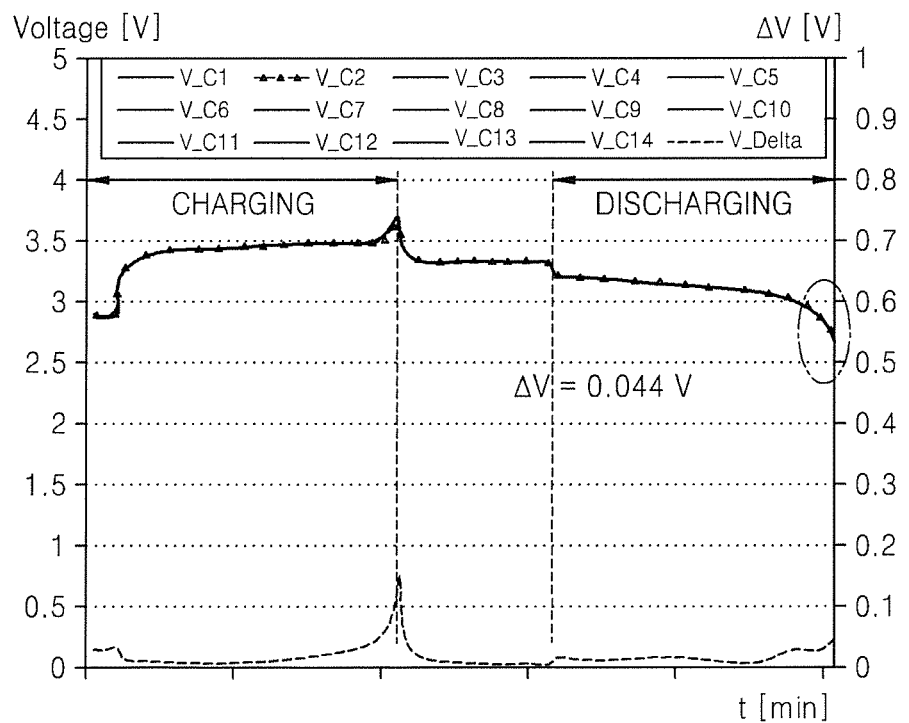
FIG. 6 is a graph illustrating charging/discharging characteristics after conducting cell balancing on the battery cells of FIG. 5 in a low voltage area.

FIG. 6 is a graph illustrating charging/discharging characteristics after conducting cell balancing using the battery cells of FIG. 5 in a low voltage area. In FIG. 6, a horizontal axis denotes time, and a vertical axis denotes a voltage.

Referring to FIG. 6, after preparation for cell balancing was completed according to FIG. 5, cell balancing was performed with respect to the second battery cell in the low voltage area. Cell balancing took about 53 hours. Then charging and discharging were performed once with respect to all the battery cells.

After cell balancing was conducted, the voltage difference ΔV after finishing charging was about 0.151 V, and the voltage difference ΔV after finishing discharging was about 0.044 V. An increase of the total capacity of the battery cells of about 1.478 Ah was measured.

Figure 7:
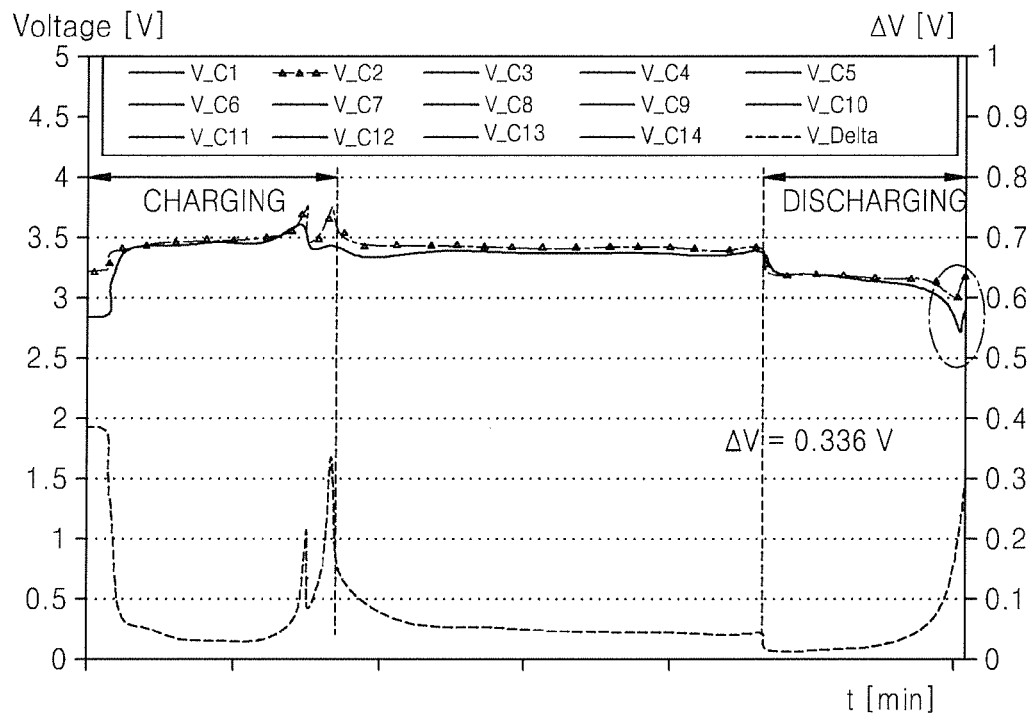
FIG. 7 is a graph illustrating charging/discharging characteristics before conducting cell balancing on the battery cells of FIG. 6 according to another embodiment of the present invention.

FIG. 7 is a graph illustrating charging/discharging characteristics before conducting cell balancing using battery cells each having the characteristics of the battery of FIG. 4 according to another embodiment of the present invention. In FIG. 7, a horizontal axis denotes time, and a vertical axis denotes a voltage. Also, a total of 14 battery cells were connected serially in an embodiment of the present invention. The graph of FIG. 7 has the same structure as that of FIG. 5.

Before conducting experiments of cell balancing of the battery cells, following operations were performed to provide a condition for cell balancing.

First, after completely discharging a plurality of battery cells, charging and discharging were performed once. Then, an initial capacity of the battery cells was measured, and a state of charge of the battery cells was adjusted to be 90% via discharging. Then, a set or predetermined battery cell or second battery cell (V_C2) was separately charged to increase its voltage by about 0.1 V and then combined (or reconnected) with the rest of the battery cells. Accordingly, the capacity of the battery cells was increased by about 4 Ah. After combining, the battery cells were completely discharged. The operations so far represent an initial state of the graph of FIG. 7.

After preparation for cell balancing is completed, charging and discharging were performed once as illustrated in FIG. 7. Here, discharging was performed until a state of charge of all the battery cells was adjusted to be 90%. The state of charge was set as 90% in order to perform cell balancing in a high voltage section.

The voltage difference ΔV of FIG. 7 after finishing charging was about 0.336 V, and the voltage difference ΔV after finishing discharging was about 0.428 V.

Figure 8:
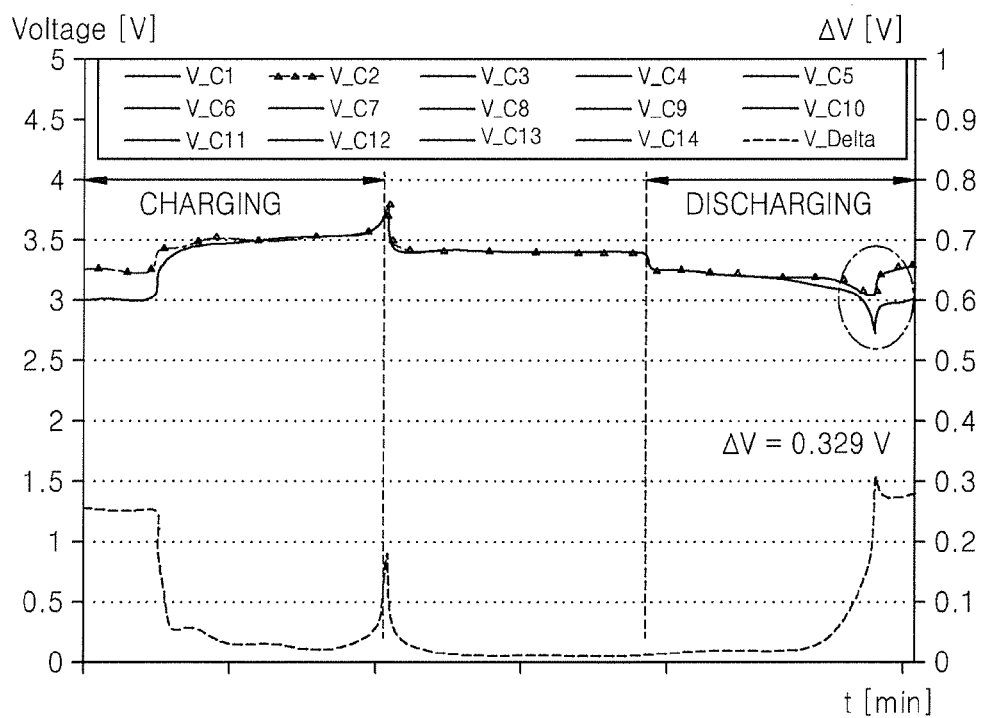
FIG. 8 is a graph illustrating charging/discharging characteristics after conducting cell balancing on the battery cells of FIG. 7 in a high voltage area.

FIG. 8 is a graph illustrating charging/discharging characteristics after conducting cell balancing using the battery cells of FIG. 7 in a high voltage area. In FIG. 8, a horizontal axis denotes time, and a vertical axis denotes a voltage.

Referring to FIG. 8, after preparation for cell balancing was completed according to FIG. 7, cell balancing was performed with respect to the second battery cell (C_V2) in the high voltage area. Cell balancing took about 2.5 hours. Then charging and discharging were performed once with respect to all the battery cells.

After cell balancing was conducted, the voltage difference ΔV after finishing charging was about 0.329 V, and the voltage difference ΔV after finishing discharging was about 0.423 V. An increase of the total capacity of the battery cells of about 0.22 Ah was measured.

While not shown in the drawings, a cell balancing operation was also performed in a middle voltage area. However, even though a set or predetermined battery cell of the battery cells was charged by about 4 Ah as in the embodiment of FIG. 5, a voltage difference between battery cells was less than a minimum measurable voltage, which means that a meaningful experiment of cell balancing was not possible or practical in the middle voltage area.

Referring to the experiments performed regarding cell balancing as illustrated in FIGS. 4 through 8, the result of cell balancing in the low voltage area was improved compared to other areas. However, in the high voltage area, capacity was improved just by 0.22 Ah. The difference in improvement of the capacity is regarded to be from characteristics of the lithium iron phosphate ($LiFePO_4$) battery.

Figure 9:
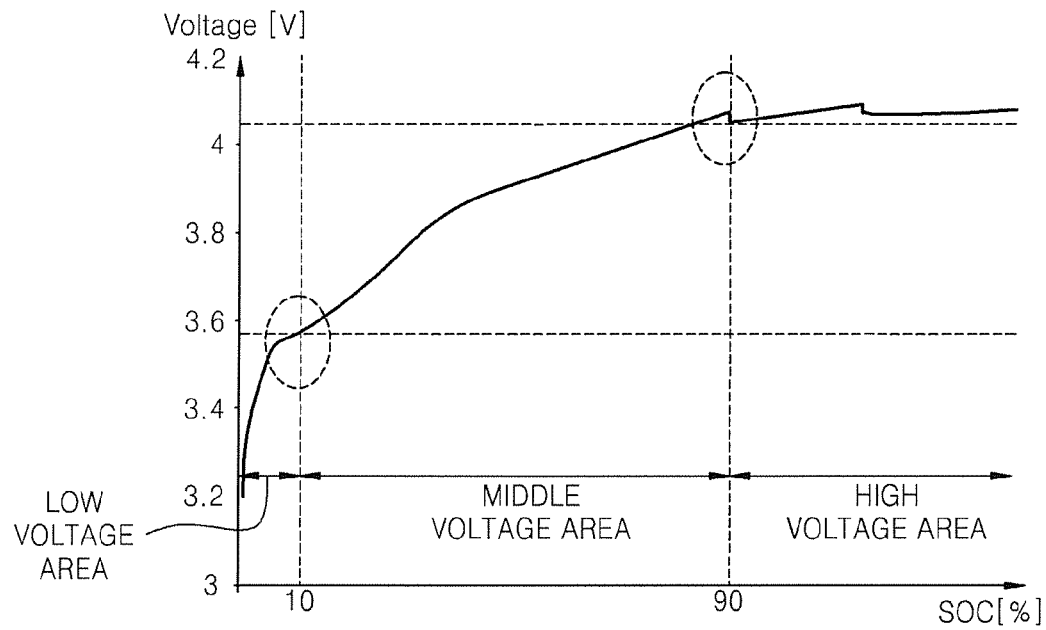
FIG. 9 is a graph illustrating charging characteristics of battery cells according to another embodiment of the present invention.

FIG. 9 is a graph illustrating charging characteristics of a battery cell according to another embodiment of the present invention.

Referring to FIG. 9, a lithium manganese oxide ($LiMn_2O_4$) battery is used as the battery cell. A charging curve includes a low voltage area where a voltage increases abruptly according to a state of charge (SOC), a middle voltage area where a voltage increases gradually, and a high voltage area where a voltage increases abruptly again. Voltages illustrated in FIG. 9 denote actually measured voltages when charging. Here, an area where a voltage is less than about 3.6 V (a state of charge of 10%) is set as a low voltage area, an area where a voltage exceeds about 4.1 V (a state of charge of 90%) is set as a high voltage area, and the remaining area where a voltage is 3.6 V to 4.1 V (a state of charge of 10-90%) is set as a middle voltage area.

Figure 10:
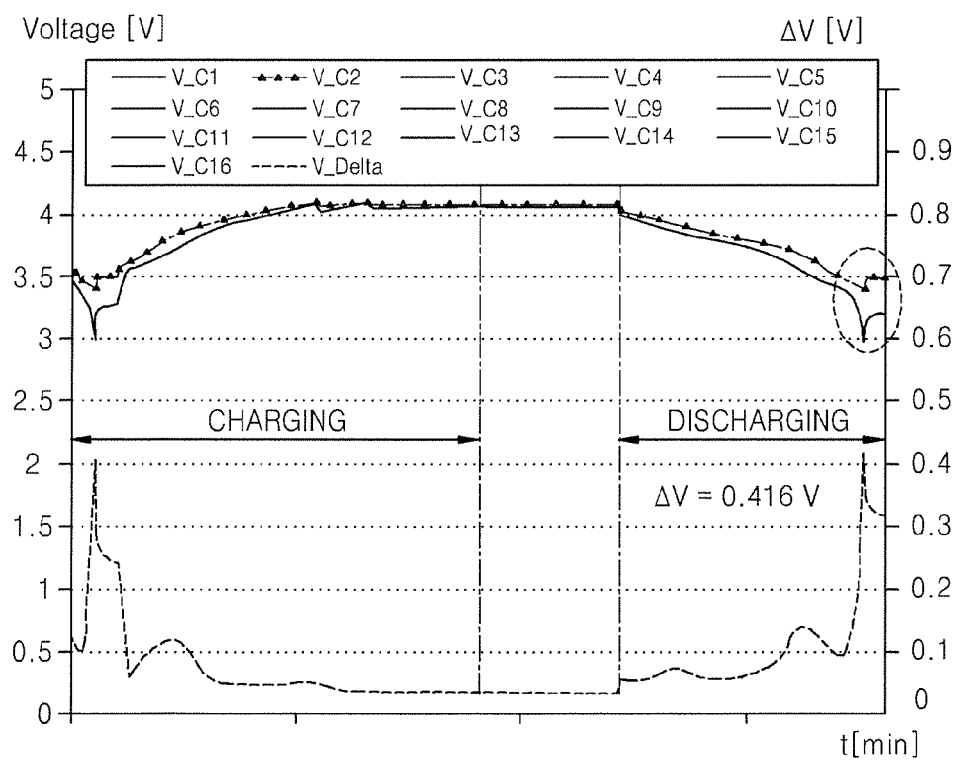
FIG. 10 is a graph illustrating charging/discharging characteristics before conducting cell balancing on the battery cells of FIG. 9 according to an embodiment of the present invention.

FIG. 10 is a graph illustrating charging/discharging characteristics before conducting cell balancing using battery cells each having characteristics of the battery cell of FIG. 9 according to an embodiment of the present invention. In FIG. 10, a horizontal axis denotes time, and a vertical axis denotes a voltage.

According to an embodiment of the present invention, a total of 16 battery cells were used, wherein two modules each including eight serially connected battery cells were included. Plots illustrated in an upper portion of the graph of FIG. 10 denote voltages of battery cells. Plots illustrated in a lower portion of the graph of FIG. 10 denote a voltage difference $\Delta V$ between a highest voltage Vmax and a lowest voltage Vmin among the voltage values of the battery cells.

Before conducting experiments of cell balancing of the battery cells, following operations were performed to provide a condition for cell balancing.

First, after completely discharging a plurality of battery cells, charging and discharging were performed once. Then, an initial capacity of the battery cells was measured, and a state of charge of the battery cells was adjusted to be 10% via discharging. Then, a set or predetermined battery cell or the second battery cell (V_C2) was separately charged to increase its voltage by about 0.1 V and then combined to the rest of the battery cells. Accordingly, the capacity of the battery cells was increased by about 5 Ah. After combining, the battery cells were completely discharged. The operations so far represent an initial state of the graph of FIG. 10.

As illustrated in FIG. 10, a plot denoted by a line including triangles denotes a voltage of the second battery cell (V_C2) that was separately charged. Voltages of the rest of the battery cells appear similar, and thus the plots of the battery cells appear to be overlapped.

After preparation for cell balancing was completed, charging and discharging were performed once as illustrated in FIG. 10. Here, discharging was performed until a state of charge of all the battery cells was adjusted to be 10%. The state of charge was set as 10% in order to perform cell balancing in a low voltage section.

The voltage difference $\Delta V$ of FIG. 10 after finishing charging was about 0.030 V, and the voltage difference $\Delta V$ after finishing discharging was about 0.416 V. The total capacity of the battery cells measured was about 54.13 Ah.

Figure 11:
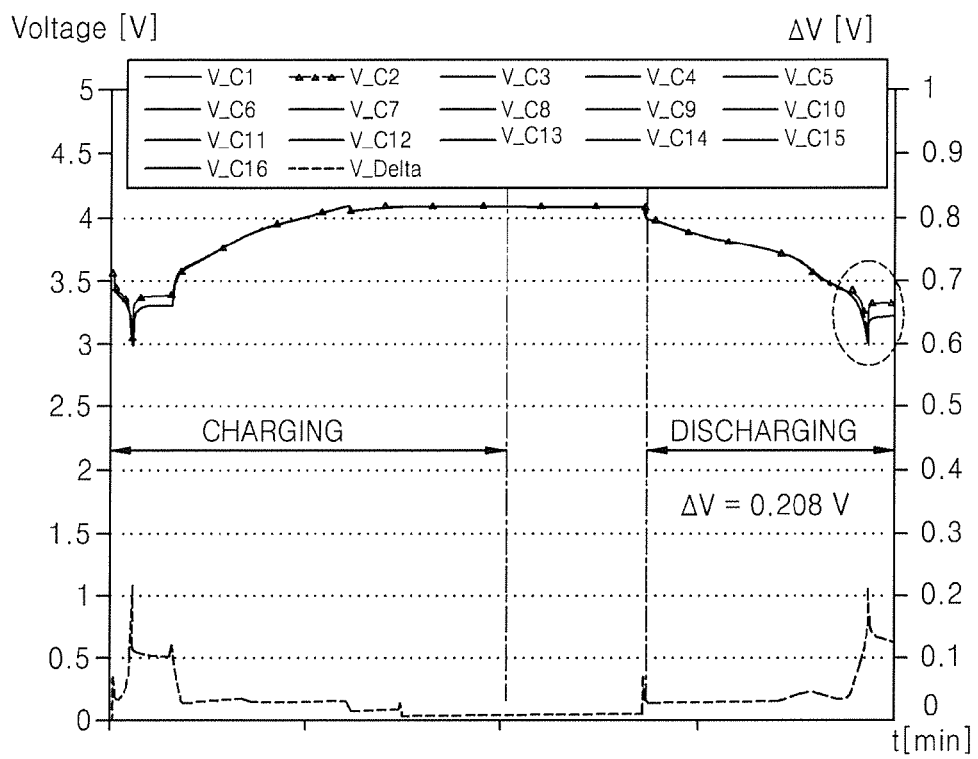
FIG. 11 is a graph illustrating charging/discharging characteristics after conducting cell balancing on the battery cells of FIG. 10 in a low voltage area.

FIG. 11 is a graph illustrating charging/discharging characteristics after conducting cell balancing using the battery cells of FIG. 10 in the low voltage area. In FIG. 11, a horizontal axis denotes time, and a vertical axis denotes a voltage.

Referring to FIG. 11, after preparation for cell balancing was completed according to FIG. 10, cell balancing was performed with respect to the second battery cell in the low voltage area. Cell balancing took about 42 hours. Then, charging and discharging were performed once with respect to all the battery cells.

After cell balancing was conducted, the voltage difference $\Delta V$ after finishing charging was about 0.013 V, and the voltage difference $\Delta V$ after finishing discharging was about 0.208 V. A total capacity of the battery cells was about 57.64 Ah, and an increase of about 3.51 Ah was measured. This corresponds to an increase of 5.85%.

Figure 12:
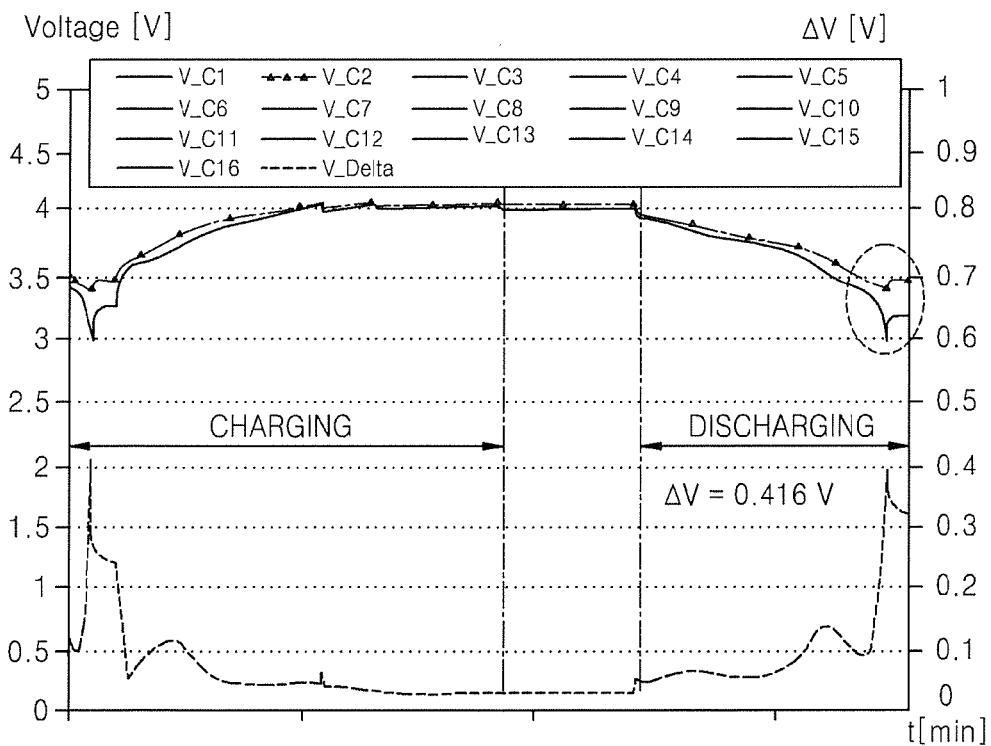
FIG. 12 is a graph illustrating charging/discharging characteristics before conducting cell balancing on the battery cells of FIG. 11 according to another embodiment of the present invention.

FIG. 12 is a graph illustrating charging/discharging characteristics before conducting cell balancing using battery cells each having the characteristics of the battery cell of FIG. 9 according to another embodiment of the present invention. In FIG. 12, a horizontal axis denotes time, and a vertical axis denotes a voltage. Two modules each including eight serially connected battery cells were also used in an embodiment of the present invention. The structure of the graph of FIG. 12 is the same as that of the graph of FIG. 10.

Before conducting experiments of cell balancing of the battery cells, following operations were performed to provide a condition for cell balancing.

First, after completely discharging a plurality of battery cells, charging and discharging were performed once. Then, an initial capacity of the battery cells was measured, and a state of charge of the battery cells was adjusted to be 90% via discharging. Then, a set or predetermined battery cell or the second battery cell (V_C2) was separately charged to increase its voltage by about 0.1 V and then combined to the rest of the battery cells. Accordingly, the capacity of the battery cells was increased by about 5 Ah. After combining, the battery cells were completely discharged. The operations so far represent an initial state of the graph of FIG. 12.

After preparation for cell balancing was completed, charging and discharging were performed once as illustrated in FIG. 12. Here, discharging was performed until a state of charge of all the battery cells was adjusted to be 90%. The state of charge was set as 90% in order to perform cell balancing in a high voltage section.

The voltage difference $\Delta V$ of FIG. 12 after finishing discharging was about 0.416 V. A total capacity of the battery cell measured was about 54.13 Ah.

Figures 13, 14:
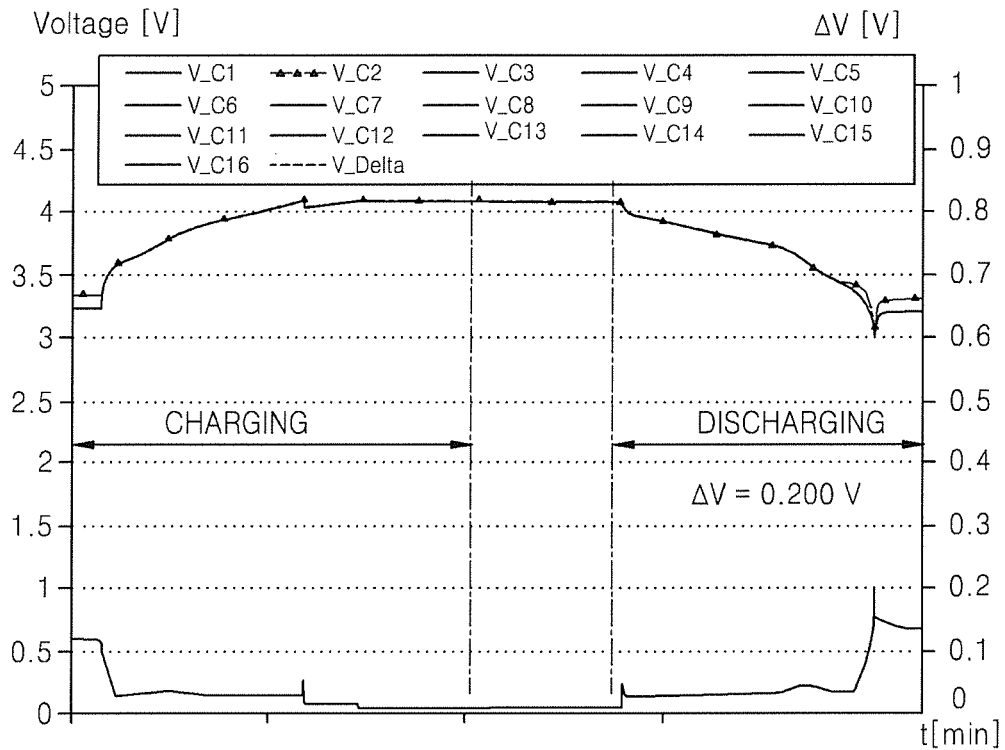
FIG. 13 is a graph illustrating charging/discharging characteristics after conducting cell balancing on the battery cells of FIG. 12 in a high voltage area.
FIG. 14 is a table showing results of cell balancing of FIGS. 4 through 13.

FIG. 13 is a graph illustrating charging/discharging characteristics after conducting cell balancing using the battery cells of FIG. 12 in the high voltage area. In FIG. 13, a horizontal axis denotes time, and a vertical axis denotes a voltage.

Referring to FIG. 13, after preparation for cell balancing was completed according to FIG. 12, cell balancing was performed with respect to the second battery cell in the high voltage area. Cell balancing took about 41.6 hours. Then, charging and discharging were performed once with respect to all the battery cells.

After cell balancing was conducted, the voltage difference $\Delta V$ after finishing charging was about 0.011 V, and the voltage difference $\Delta V$ after finishing discharging was about 0.200 V. A total capacity of the battery cells measured was about 57.66 Ah.

FIG. 14 is a table showing results of cell balancing performed using the battery cells of FIGS. 4 through 13.

When a lithium iron phosphate ($LiFePO_4$) battery was used to perform cell balancing in a low voltage area, a capacity of the battery was increased from 45.44 Ah to 46.92 Ah.

On the other hand, when a lithium iron phosphate (LiFePO$_4$) battery was used to perform cell balancing in a high voltage area, a capacity of the battery was increased from 45.44 Ah to 45.66 Ah.

When a lithium manganese oxide (LiMn$_2$O$_4$) battery was used to perform cell balancing in the low voltage area, a capacity of the battery was increased from 54.13 Ah to 57.64 Ah.

On the other hand, when a lithium manganese oxide (LiMn$_2$O$_4$) battery was used to perform cell balancing in the high voltage area, a capacity of the battery was increased from 54.13 Ah to 57.66 Ah.

As shown in FIG. 14, cell balancing effects were hardly noticeable for a lithium iron phosphate (LiFePO$_4$) battery in the high voltage area, but cell balancing effects were noticeable for a lithium manganese oxide (LiMn$_2$O$_4$) battery in the high voltage area. Both types of batteries were clearly affected by cell balancing in the low voltage area. In other words, voltage areas where cell balancing was efficiently performed varied according to the type of battery cells, and thus the type of the battery cells has to be considered in order to perform an efficient cell balancing operation of the battery cells.

Hereinafter, battery cell characteristics that are to be considered in order to perform an efficient cell balancing operation of the battery cells will be described.

Figure 15:
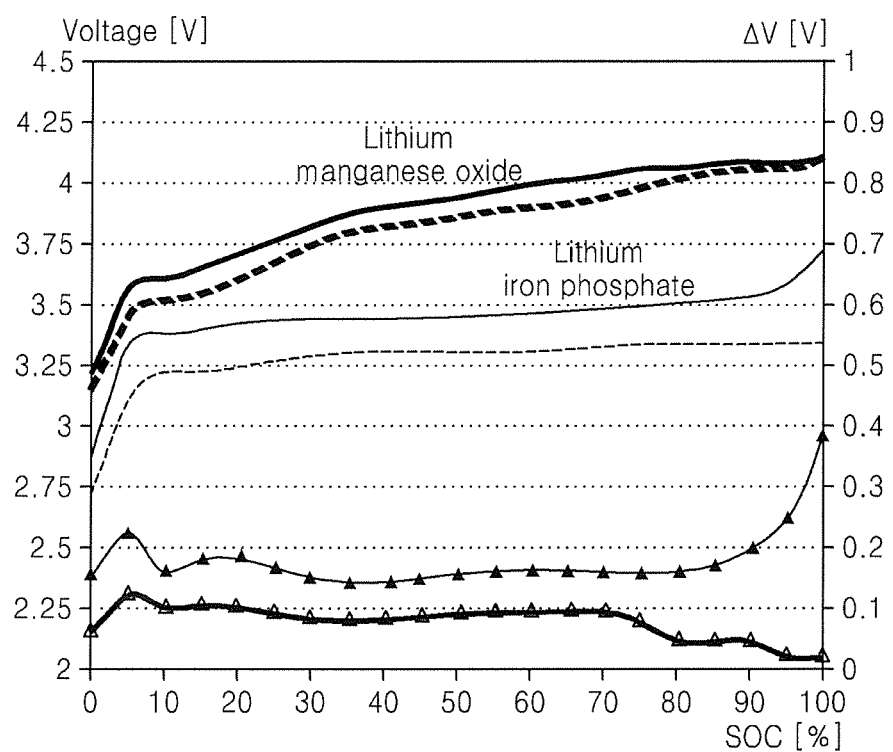
FIG. 15 is a graph illustrating characteristics of the battery cells of FIGS. 4 and 9.

FIG. 15 is a graph illustrating characteristics of the battery cells of FIGS. 4 and 9. In FIG. 15, a horizontal axis denotes a state of charge (SOC), and a vertical axis denotes a voltage.

Referring to FIG. 15, a thick solid line denotes a voltage curve of a lithium manganese oxide (LiMn$_2$O$_4$) battery, and a thick dotted line denotes an open circuit voltage of the lithium manganese oxide (LiMn$_2$O$_4$) battery.

Likewise, a thin solid line denotes a voltage curve of a lithium iron phosphate (LiFePO$_4$) battery, and a thin dotted line denotes an open circuit voltage of the lithium iron phosphate (LiFePO$_4$) battery.

A plot denoted in a lower portion by a thin dotted line including triangles shows a difference between the voltage curve and the open circuit voltage of the lithium iron phosphate (LiFePO$_4$) battery.

A plot denoted in the lower portion by a thick dotted line including triangles shows a difference between the voltage curve and the open circuit voltage of the lithium manganese oxide (LiMn$_2$O$_4$) battery.

As shown in FIG. 15, the open circuit voltage of the lithium iron phosphate (LiFePO$_4$) battery is saturated after about a state of charge of 40%. However, around 90%, that is, before charging is completed, an increase ratio of the open circuit voltage increases again.

The open circuit voltage (OCV) refers to the difference of electrical potential between two terminals of a battery when there is no external load connected (e.g., the circuit is open) or when there is no effective load connected. However, there may be current flow internally (e.g. self-discharge currents). The OCV of a battery may be measured under particular conditions (e.g., state-of-charge, temperature, etc.).

Accordingly, it is difficult to recognize a difference in states of charge of the lithium iron phosphate (LiFePO$_4$) battery just by measuring a voltage of the battery. In particular, if a voltage of an imbalanced battery cell abruptly increases before other battery cells and reaches a charging limit voltage before charging is completed for all the battery cells, charging is ended while the rest of the battery cells are not charged sufficiently.

On the other hand, the lithium manganese oxide (LiMn$_2$O$_4$) battery shows a decreasing increase ratio of the open circuit voltage after reaching a state of charge of 10% compared to before reaching the state of charge of 10%. However, the open circuit voltage continuously increases at a predetermined inclination angle until charging is completed.

Accordingly, in the case of the lithium manganese oxide (LiMn$_2$O$_4$) battery, problems such as those occurring for the lithium iron phosphate (LiFePO$_4$) battery may be eliminated or reduced.

Figure 16:
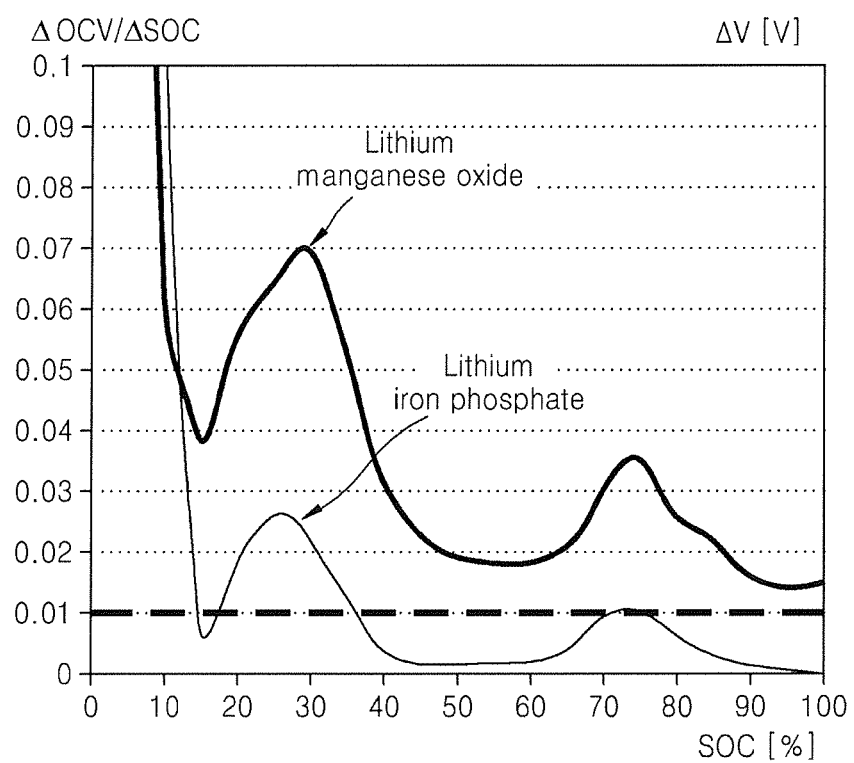
FIG. 16 is a graph illustrating other characteristics of the battery cells of FIGS. 4 and 9.

FIG. 16 is a graph illustrating characteristics of the battery cells of FIGS. 4 and 9. In FIG. 16, a horizontal axis denotes a state of charge, and a vertical axis denotes a differential value ($\Delta$OCV) in the OCV of the battery cell per a change ($\Delta$SOC) of the SOC of the battery cell.

Referring to FIG. 16, a dotted line indicating 0.01 V in a lower portion denotes a minimum unit of a measurable voltage in a cell balancing apparatus. That is, if a voltage difference is 10 mV or less, the difference is not recognized.

If a state of charge of a lithium iron phosphate (LiFePO$_4$) battery is about 35%, the differential value in the open circuit voltage of the battery per the change of the state of charge is less than 10 mV. Around a state of charge of 100%, that is, when charging is completed, the differential value in the open circuit voltage per the change of the state of charge decreases to 0.4 mV. In order to measure this voltage difference, more expensive equipment has to be used, which, however, generates a trade-off with the costs.

However, a differential value in an open circuit voltage of a lithium manganese oxide (LiMn$_2$O$_4$) battery per a change of a state of charge exceeds 10 mV from 0% SOC through 100% SOC. Accordingly, the cell balancing apparatus may sense a voltage difference in all SOC conditions, and may perform cell balancing effectively.

Considering the results of experiments according to the types of the battery cells as described above, in order to efficiently perform cell balancing, characteristics of the battery cells need to be understood or considered. The characteristics of the battery cells may be both electrical and chemical characteristics.

In addition, in order to efficiently perform cell balancing, a variation in an open circuit voltage according to a state of charge of the battery cells may be set to be less than a set or predetermined reference.

Moreover, if a section where cell balancing may be performed efficiently is set in advance according to the types of battery cells, sections other than this section may be set such that the controller 300 does not perform calculation regarding a cell balancing operation. Consequently, a load of the controller 300 due to performing cell balancing calculations may be reduced.

FIG. 17 is a flowchart illustrating a cell balancing method according to an embodiment of the present invention.

Referring to FIG. 17, charging and discharging of battery cells are repeated in operation S10. The controller 300 measures voltages of the battery cells in operation S11.

The controller 300 determines whether or not a voltage difference $\Delta V$ between a highest voltage Vmax and a lowest voltage Vmin among measured voltages of the battery cells is smaller than a reference voltage Vref in operation S12.

If it is determined that the voltage difference $\Delta V$ is not smaller than the reference voltage Vref, the method returns to operation S10 to perform charging and discharging. If it is determined that the voltage difference $\Delta V$ is smaller than the reference voltage Vref, whether or not a value $\Delta$OCV/$\Delta$SOC corresponding to a change in an open circuit voltage per a change of a state of charge is greater than a reference inclination Sref is determined in operation S13.

If it is determined that the value ΔOCV/ΔSOC is not greater than the reference inclination Sref, the method returns to operation S10 to perform charging and discharging. However, if it is determined that the value ΔOCV/ΔSOC is greater than the reference inclination Sref, cell balancing is performed with respect to a corresponding battery cell in operation S14.

While performing cell balancing, whether or not the voltage difference ΔV is greater than the reference voltage Vref is determined in operation S15. If it is determined that the voltage difference ΔV is greater than the reference voltage Vref, it is determined that cell balancing still has to be performed and the method returns to operation S14. On the other hand, if it is determined that the voltage difference ΔV is not greater than the reference voltage Vref, it is determined that cell balancing is completed and thus the cell balancing is finished.

According to the methods of the embodiments of the present invention, cell balancing may be efficiently performed according to the types and characteristics of battery cells by using the cell balancing apparatus and the energy storage system including the cell balancing apparatus.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a," "an," "the," and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention as defined by the appended claims and their equivalents.

What is claimed is:

1. A method of balancing a plurality of battery cells, the method comprising:
   acquiring by a controller, an, open circuit voltage (OCV) of a battery cell of the plurality of battery cells connected in series;
   determining, by the controller, a state of charge (SOC) of the battery cell based on the OCV of the battery cell;
   determining, by the controller, a value (ΔOCV/ΔSOC) corresponding to a change in the OCV (ΔOCV) of the battery cell per a change of the SOC (ΔSOC) of the battery cell, in accordance with the SOC of the battery cell; and
   activating, by the controller, cell balancing of the plurality of battery cells when the value (ΔOCV/ΔSOC) is greater than a reference value.

2. The method of claim 1, further comprising:
   determining, by the controller, a voltage difference between a maximum voltage and a minimum voltage among the open circuit voltages (OCVs) of the battery cells; and
   activating, by the controller, cell balancing of the plurality of battery cells when the voltage difference is greater than a reference voltage.

3. The method of claim 2, further comprising:
   monitoring, by the controller, the voltage difference; and
   inactivating, by the controller, the cell balancing of the battery cells when the voltage difference is less than or equal to the reference voltage.

4. The method of claim 1, wherein activating cell balancing of the plurality of battery cells comprises performing selectively charging or discharging the battery cell.

5. A cell balancing device comprising:
   a battery management unit electrically connected with a plurality of battery cells, wherein the battery management unit is configured to:
   acquire an open circuit voltage (OCV) of a battery cell of the plurality of battery cells;
   determine a state of charge (SOC) of the battery cell based on the OCV of the battery cell;
   determine a value (ΔOCV/ΔSOC) corresponding to a change in the OCV (ΔOCV) of the battery cell per a change of the SOC (ΔSOC) of the battery cell, in accordance with the SOC of the battery cell; and
   activate cell balancing of the plurality of battery cells when the value (ΔOCV/ΔSOC) is greater than a reference value.

6. The cell balancing device of claim 5, wherein the battery management unit is further configured to:
   determine a voltage difference between a maximum voltage and a minimum voltage among the open circuit voltages (OCVs) of the battery cells; and
   activate cell balancing of the plurality of battery cells when the voltage difference is greater than a reference voltage.

7. The cell balancing device of claim 6, wherein the battery management unit is further configured to monitor the voltage difference and to inactivate the cell balancing of the battery cells when the voltage difference is less than the reference voltage.

8. The cell balancing device of claim 6, wherein the battery management unit comprises:
   a controller; and
   a cell balancing unit electrically connected to the battery cells and operatively connected to the controller, wherein the cell balancing unit is configured to selectively discharge the battery cell in accordance with control signals from the controller.

9. An energy storage system comprising:
   a battery system for storing energy from an energy generation system or a power grid; and
   a power conversion system for controlling power conversion among the battery system, the energy generation system, and the power grid,
   wherein the battery system comprises:
   a plurality of serially connected battery cells; and a battery management unit electrically connected with the battery cells, wherein the battery management unit is configured to:
- acquire an open circuit voltage (OCV) of a battery cell of the plurality of battery cells;
- determine a state of charge (SOC) of the battery cell based on the OCV of the battery cell;
- determine a value ($\Delta OCV/\Delta SOC$) corresponding to a change in the OCV ($\Delta OCV$) of the battery cell per a change of the SOC ($\Delta SOC$) of the battery cell, in accordance with the SOC of the battery cell; and
- activate cell balancing of the plurality of battery cells when the value ($\Delta OCV/\Delta SOC$) is greater than a reference value.

10. The energy storage system of claim 9, wherein the battery management unit is further configured to:
- determine a voltage difference between a maximum voltage and a minimum voltage among the open circuit voltages (OCVs) of the battery cells; and
- activate cell balancing of the plurality of battery cells when the voltage difference is greater than a reference voltage.

11. The energy storage system of claim 10, wherein the battery management unit is configured to selectively charge or discharge the battery cell when cell balancing is activated.

* * * * *